(12) United States Patent
Hanechak (10) Patent No.: US 8,522,140 B2
(45) Date of Patent: *Aug. 27, 2013

(54) AUTOMATED MARKUP LANGUAGE LAYOUT

(75) Inventor: Brian D. Hanechak, Waltham, MA (US)

(73) Assignee: Vistaprint Technologies Limited, Hamilton (BM)

(*) Notice: Subject to any disclaimer, the term of this patent is extended or adjusted under 35 U.S.C. 154(b) by 516 days.

This patent is subject to a terminal disclaimer.

(21) Appl. No.: 12/692,066

(22) Filed: Jan. 22, 2010

(65) Prior Publication Data
US 2010/0131839 A1    May 27, 2010

Related U.S. Application Data

(63) Continuation of application No. 11/207,647, filed on Aug. 19, 2005, now Pat. No. 7,676,744.

(51) Int. Cl.
*G06F 17/00* (2006.01)
(52) U.S. Cl.
USPC .......................................... 715/243; 715/244
(58) Field of Classification Search
USPC ..................... 715/255, 243, 244, 246, 200
See application file for complete search history.

(56) References Cited

U.S. PATENT DOCUMENTS

| | | | |
|---|---|---|---|
| 4,581,710 A * | 4/1986 | Hasselmeier | 358/1.17 |
| 4,773,009 A | 9/1988 | Kucera et al. | |
| 5,031,121 A * | 7/1991 | Iwai et al. | 715/246 |
| 5,263,132 A | 11/1993 | Parker et al. | |
| 5,559,934 A | 9/1996 | Ogura et al. | |
| 5,561,421 A | 10/1996 | Smith et al. | |
| 5,588,072 A * | 12/1996 | Wang | 382/176 |
| 5,649,216 A | 7/1997 | Sieber | |
| 5,671,438 A * | 9/1997 | Capps et al. | 715/234 |
| 5,835,920 A | 11/1998 | Horton | |
| 5,845,303 A | 12/1998 | Templeman | |
| 5,848,184 A | 12/1998 | Taylor et al. | |
| 5,848,186 A | 12/1998 | Wang et al. | |
| 5,857,212 A * | 1/1999 | Van De Vanter | 715/234 |
| 5,873,106 A * | 2/1999 | Joseph | 715/203 |
| 5,937,084 A | 8/1999 | Crabtree et al. | |
| 6,081,816 A | 6/2000 | Agrawal | |

(Continued)

FOREIGN PATENT DOCUMENTS
EP       0327781       8/1989

OTHER PUBLICATIONS

Furuta et al., Interactively Editing Structured Documents, Electronic Publishing Apr. 1988, pp. 19-44.*

(Continued)

*Primary Examiner* — Cong-Lac Huynh
(74) *Attorney, Agent, or Firm* — Jessica Costa (57) ABSTRACT

Methods and computer programs for automatically creating a text layout in a markup language design for a product to be printed. A number of defined text elements are available for user text. The layout is based on the text elements having user text content. Text elements without text content are disregarded. Positioning of the text elements is determined based on the height of the text elements, defined text element spacing distances, and a defined positioning order. Creating a layout may include positioning design elements relative to the text elements. Font sizes and spacing distances are automatically reduced if necessary to create a suitable layout.

64 Claims, 9 Drawing Sheets

(56) References Cited

U.S. PATENT DOCUMENTS

| | | | |
|---|---|---|---|
| 6,532,461 B2 * | 3/2003 | Evans | 715/200 |
| 6,826,727 B1 | 11/2004 | Mohr et al. | |
| 6,918,085 B1 | 7/2005 | Laval et al. | |
| 6,948,119 B1 | 9/2005 | Farmer et al. | |
| 7,028,255 B1 | 4/2006 | Ayers | |
| 7,237,193 B1 | 6/2007 | Zaky et al. | |
| 7,263,659 B2 * | 8/2007 | Hull et al. | 715/716 |
| 7,356,760 B2 * | 4/2008 | Jaeger | 715/246 |
| 7,373,593 B2 | 5/2008 | Uchida | |
| 7,409,635 B2 | 8/2008 | Epstein | |
| 7,434,159 B1 | 10/2008 | Lin | |
| 7,461,332 B2 * | 12/2008 | Brintzenhofe et al. | 715/205 |
| 7,475,333 B2 * | 1/2009 | Otter et al. | 715/222 |
| 7,478,328 B2 * | 1/2009 | Hannebauer et al. | 715/731 |
| 7,584,424 B2 * | 9/2009 | Hanechak | 715/244 |
| 7,602,972 B1 * | 10/2009 | Wei et al. | 382/225 |
| 7,640,499 B2 * | 12/2009 | Kato | 715/272 |
| 7,783,969 B1 | 8/2010 | Menninga | 715/245 |
| 7,801,358 B2 * | 9/2010 | Furmaniak et al. | 382/180 |
| 7,962,462 B1 * | 6/2011 | Lamping et al. | 707/706 |
| 8,020,093 B2 * | 9/2011 | Yalovsky | 715/244 |
| 8,127,227 B1 * | 2/2012 | Kates et al. | 715/243 |
| 8,261,180 B2 * | 9/2012 | Bastos dos Santos et al. | 715/227 |
| 2002/0116418 A1 | 8/2002 | Lachhwani et al. | |
| 2002/0178223 A1 | 11/2002 | Bushkin | |
| 2003/0084055 A1 | 5/2003 | Tanaka | |
| 2003/0125931 A1 | 7/2003 | Campbell | |
| 2003/0192011 A1 | 10/2003 | Williamson et al. | |
| 2004/0194036 A1 | 9/2004 | Wolska et al. | |
| 2004/0205602 A1 | 10/2004 | Croeni | |
| 2004/0205642 A1 | 10/2004 | Menninga | |
| 2004/0225962 A1 | 11/2004 | Ohashi et al. | |
| 2004/0249664 A1 * | 12/2004 | Broverman et al. | 705/2 |
| 2005/0010859 A1 * | 1/2005 | McDonough et al. | 715/500 |
| 2005/0034068 A1 * | 2/2005 | Jaeger | 715/517 |
| 2005/0050462 A1 * | 3/2005 | Whittle et al. | 715/517 |
| 2005/0094207 A1 | 5/2005 | Lo et al. | |
| 2005/0216836 A1 | 9/2005 | Duke et al. | |
| 2005/0262437 A1 * | 11/2005 | Patterson et al. | 715/517 |
| 2006/0031761 A1 * | 2/2006 | Ohta | 715/517 |
| 2006/0064635 A1 * | 3/2006 | Reid et al. | 715/517 |
| 2006/0112333 A1 | 5/2006 | Iwanaga | |
| 2006/0117255 A1 * | 6/2006 | Seeler | 715/520 |
| 2007/0079282 A1 | 4/2007 | Nachnani et al. | |
| 2007/0150358 A1 | 6/2007 | Allen et al. | |
| 2007/0266309 A1 * | 11/2007 | Sellman | 715/513 |
| 2007/0286484 A1 | 12/2007 | Xie et al. | |
| 2008/0295019 A1 * | 11/2008 | Han et al. | 715/781 |
| 2009/0307583 A1 * | 12/2009 | Tonisson | 715/246 |
| 2010/0153889 A1 * | 6/2010 | Krause | 715/856 |
| 2010/0174985 A1 * | 7/2010 | Levy et al. | 715/244 |
| 2011/0145701 A1 * | 6/2011 | Dejean et al. | 715/246 |

OTHER PUBLICATIONS

Ali et al., Adaptive Layout for Interactive Documents, Springerlink 2008, pp. 247-254.*

Yamamoto et al., Interaction Design of Tools for Fostering Creativity in the Early Stages of Information Design, ScienceDirect 2005, pp. 513-535.*

Chao et al., Layout and Content Extraction for PDF Documents, Springer 2004, pp. 213-224.*

Ryu et al., Parameter-independent Geometric Document Layout Analysis, IEEE 2000, pp. 397-400.*

Hurst et al., Layout and Language: Integrating Spatial and Linguistic Knowledge for Layout Understanding Tasks, ACM 2000, pp. 334-340.*

Lienhart et al., "Localizing and Segmenting Text in Images and Videos," IEEE 2002, pp. 256-268.

Xiao et al., "Text Region Extraction in a Document Image Based on the Delaunay Tessellation," Google 2003, pp. 799-809.

Liang et al., "Performance Evaluation of Document Layout Analysis Algorithms on the UW data set," Google 1997, pp. 1-12.

Sebrechts et al., "Visualization of Search Results: A Comparative Evaluation of Text, 2D and 3D Interface," ACM 1999, pp. 3-10.

Power et al., "Document Structure," Google 2003, pp. 1-50.

Krieger, "12 Tips for Creating Better Presentations," [Online], Jan. 7, 2005, XP002448464, http://www.microsoft.com/AtWork/getworkdone/presentations.mspx>.

Microsoft Paint, Windows 2000, © Microsoft Corp, Nov. 30, 1999.

Microsoft Paint Screenshots Figure 5; created using Microsoft Paint 5.0.2150.1 in U.S. Appl. No. 12/428,794.

* cited by examiner

AUTOMATED MARKUP LANGUAGE LAYOUT

REFERENCE TO PRIOR APPLICATION

This application is a continuation of prior application Ser. No. 11/207,647, filed on Aug. 19, 2005, which is hereby incorporated by reference in its entirety.

FIELD OF THE INVENTION

This invention relates to the creation of customized markup language designs.

BACKGROUND OF THE INVENTION

Printing services Web sites that allow a user to access the site from the user's home or work and design a personalized document are well known and widely used by many consumers, professionals, and businesses. Typically, these types of sites allow the user to review thumbnail images of a number of customizable designs prepared by the site operator with a variety of different styles, formats, backgrounds, color schemes, fonts and designs from which the user may choose. When the user has selected a specific template design to customize, the sites typically provide online tools allowing the user to incorporate the user's personal information into the selected template to create a custom document design. When the design is completed to the user's satisfaction, the user can place an order through the site for production and delivery of a desired quantity of the corresponding printed product.

One very common printed product that is often ordered through printing services sites is the business card. The type of information that is normally provided on a typical business card is well known and can be fairly reliably predicted. To facilitate the easy and rapid preparation of a business card, printing services sites often provide a simple text entry tool that can be easily used by customers with little or no online product design experience.

Figure 1:
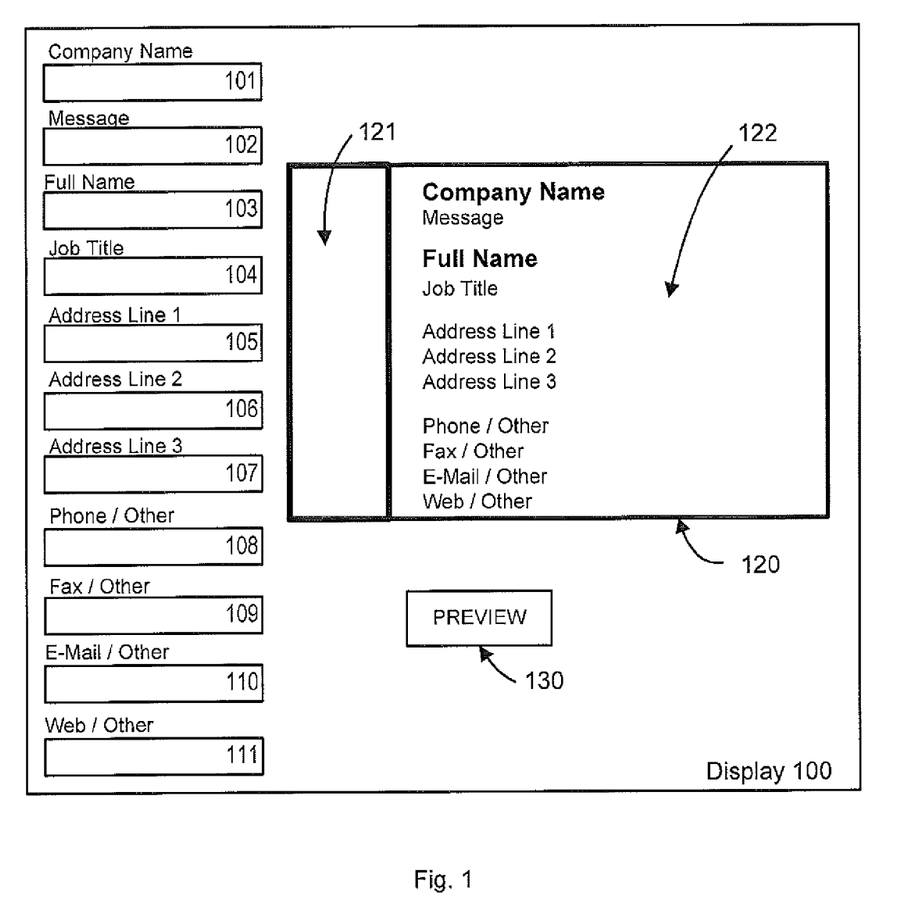
FIG. 1 shows an initial document customization screen.

Referring to FIG. 1, a representative online business card creation screen displayed to a user at the user's computer system is depicted. In this example, text entry fields 101-111 into which the user can type the desired information are provided. To assist the user, each text entry field 101-111 has an associated text label indicating the specific information the services provider recommends that the user enter into that field. For example, field 101 is indicated as the field for entering the user's company name, field 102 is the field for the user's company message, and so forth. The fields are normally empty when initially displayed to the user.

Template image 120 is the particular business card design template selected by the user for customization. In the example shown in FIG. 1, template image 120 contains an image area 121 and a text entry area 122. Template 120 is merely representative and other template designs could have one or more images of different sizes and/or positions or no images at all.

The service provider will typically have specified a default font, font size, and other font characteristics in which each user text entry will be displayed. To illustrate to the user the location and appearance of the user's information as it will appear in the design, generic text entries such as "Company Name", "Full Name" and so forth are initially displayed in template 120. Preview button 130 is provided to allow the user to cause template 120 to be updated to replace the default generic text information in text area 122 with the information entered by the user in fields 101-111. Display 100 may also include various other items, not shown, such as informational, navigational, and promotional banners, messages and links.

Because the user is interacting with the service provider's site using a Web browser program running on the user's computer system, the document creation tools and displays are provided by the server to the user's computer in a markup language such as XHTML (eXtensible Hypertext Markup Language) suitable for execution by the browser program. What the user sees on the user's display as the design of a business card is the result of the browser's rendering of a collection of discrete markup language elements.

Each text entry field 101-111 is associated with an individual textbox. The individual textbox elements of template 120 are depicted for illustration in FIG. 2. Text entry fields 101-111 correspond to textboxes 201-211. As is well understood by those of skill in the art, each textbox element will have a number of associated parameters. Some parameters relate to the displaying of the text in the textbox, such as the font to be used, font size, font color, and font attributes such as bolding or italics. Other parameters relate to the textbox itself, such as the width of the textbox, the absolute or relative position of the textbox, and whether or not text wrapping is enabled.

Figure 2:
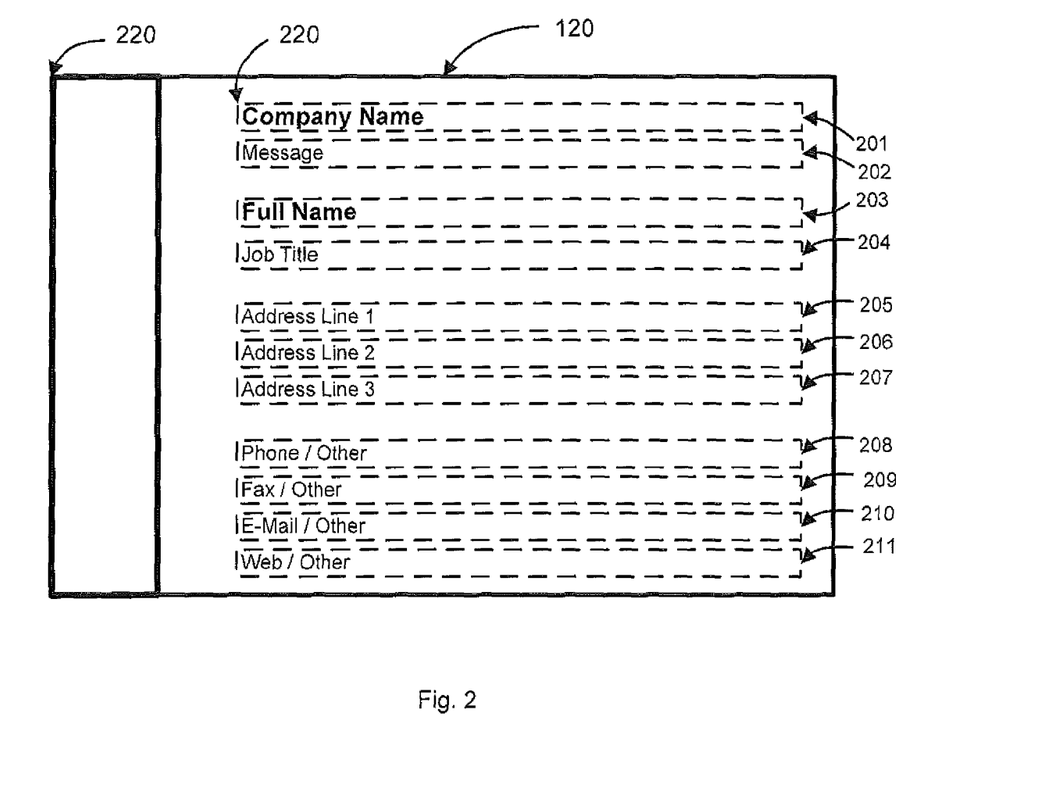
FIG. 2 shows the textbox elements of template 120.

In a typical prior art application of this type of design system, each textbox element is assigned a fixed absolute position within the overall template 120 design. For example, the horizontal and vertical pixel offset of the upper left corner of each textbox, such as corner 220 of text box 201, relative to the upper left corner 221 of the template 120 image is defined for each textbox 201-211. While this type of inflexible design may result in an acceptable finished product in many cases, in some situations the product design will be aesthetically unpleasing or possibly so defective as to be completely unusable.

While template 120 has been designed to yield a pleasing card containing eleven common business card data entries, some users have no use or desire for eleven different entries. The user is not forced to make an entry in each field and may choose to leave one or more fields empty. If a user makes entries in only a few of the fields, spacing between entries in the product design may be uneven and unattractive. For example, if a user entered only a company name in text field 101, a name in text field 103, and a Web address in field 111, the resulting three lines of information displayed in textboxes 201, 203 and 211 would be widely separated over almost the entire height of the card.

Another drawback in the prior art is that the template 120 layout design anticipates that all entries by a user will fit on one line. A problem is created if the user enters more text than the textbox can accommodate on a single line. If text wrapping for a textbox is not enabled, the user's desired text will exceed the line capacity and will be truncated. If text wrapping is enabled, when the user's text exceeds the capacity of a single line, the text will be wrapped onto a second line, often resulting in the text content of one textbox overlapping the text content of another textbox, creating an unusable design. Both of these situations are clearly undesirable.

There is, therefore, a need for a flexible design layout method that automatically adjusts the design according to the text entries made by the user.

SUMMARY

The present invention is directed at satisfying the need for automated generation of aesthetically pleasing text layouts in a markup language design.

In accordance with one aspect of the invention, a plurality of text elements are defined for receiving user text for incorporation into a markup language design. In creating a text layout, text elements having no text content are disregarded. Positions of the text elements having text content are determined based on the heights of the text elements, defined spacing distances between adjacent text elements, and the defined text element positioning order.

It is an advantage of the invention that attractive text layouts can be automatically created for a wide variety of user text entry choices.

These and other objects, features and advantages of the invention will be better understood with reference to the accompanying drawings, description and claims.

DETAILED DESCRIPTION

For the purposes of illustration and discussion, the invention will be described in the context of the online design of a business card. It will be understood that the invention is not so limited and can be employed in any type of customization application where there is a requirement or desire to automatically create a layout within a defined area of a markup language design.

Figure 3:
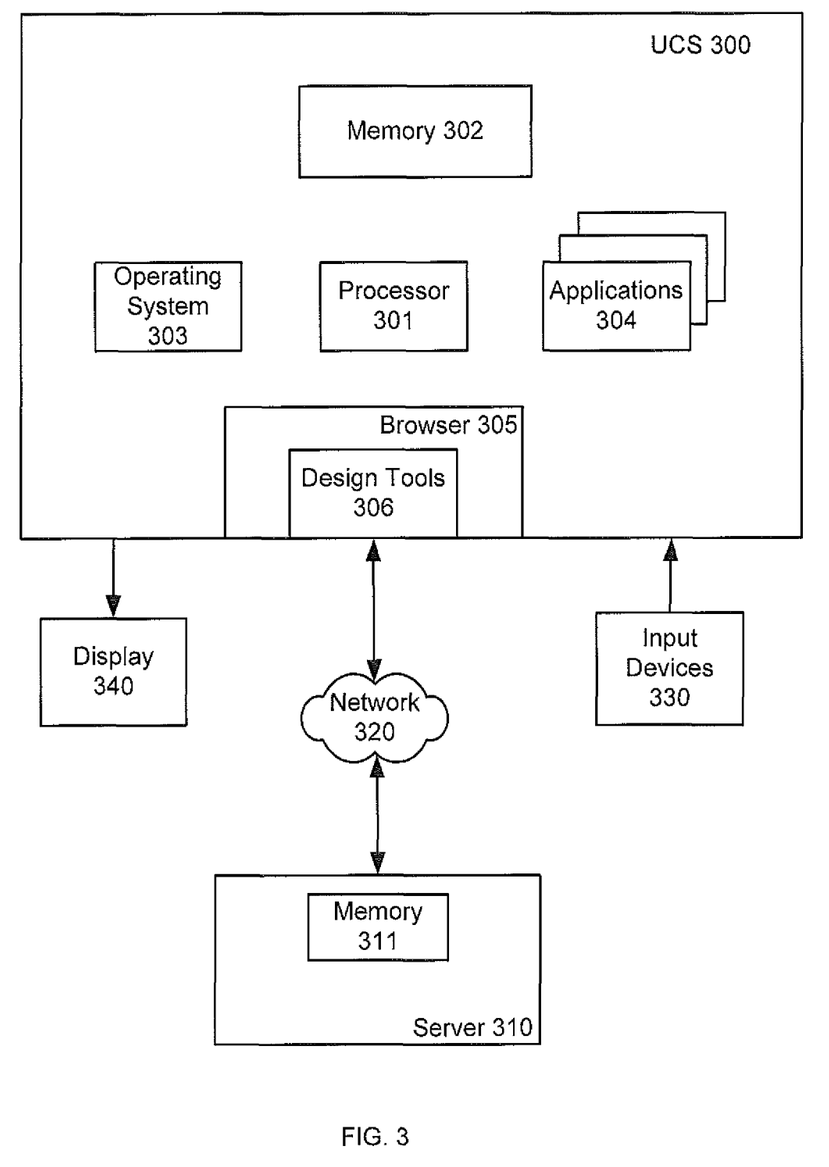
FIG. 3 shows a representative system with which the invention may be employed

FIG. 3 depicts a typical system with which the invention may be employed. User computer system UCS 300 includes processor 301 and memory 302. Memory 302 represents all UCS 300 components and subsystems that provide data storage, such as RAM, ROM, and hard drives. In addition to providing permanent storage for all programs installed on UCS 300, memory 302 also provides temporary storage required by the operating system and the applications while they are executing. In a preferred embodiment, UCS 300 is a typically equipped personal computer, but UCS 300 could also be a portable computer, a tablet computer, or other device. The user views images from UCS 300 on display 340, such as a CRT or LCD screen, and provides inputs to UCS 300 via input devices 330, such as a keyboard and a mouse.

When UCS 300 is operating, an instance of the USC 300 operating system, for example a version of the Microsoft Windows operating system, will be running, represented in FIG. 3 by operating system 303. In addition, the user may be running one or more application programs Applications 304. In FIG. 3, UCS 300 is running Web browser 305, such as Internet Explorer from Microsoft Corporation. In the depicted embodiment, design tools 306 is a product design program downloaded to UCS 300 via network 320 from remote server 310, such as downloadable design tools provided by VistaPrint Limited and publicly available at vistaprint.com. Design tools 306 runs in browser 305 and exchanges information and instructions with server 310 during a design session to support the user's preparation of a customized product design in electronic form. When the customer is satisfied with the design of the product, the design can be uploaded to server 310 for storage and, if desired by the user, subsequent production of the desired quantity of the physical product on appropriate printing and post-print processing systems.

While server 310 is shown in FIG. 3 as a single block, it will be understood that server 310 could be multiple servers configured to communicate and operate cooperatively to support Web site operations. Server 310 will typically be interacting with many user computer systems, such as UCS 300, simultaneously. Memory 311 represents all components and subsystems that provide server data storage, such as RAM, ROM, and disk drives or arrays. Memory 311 includes the various layouts, designs, colors, fonts, and other information provided by the service provider to enable the creation and rendering of templates. As used in the embodiment described herein, a markup language product design, such as template 120, is an XML description that specifies the size, position and other attributes of all product elements such as text containers, image containers, graphics, z-index values and so forth.

Figure 4:
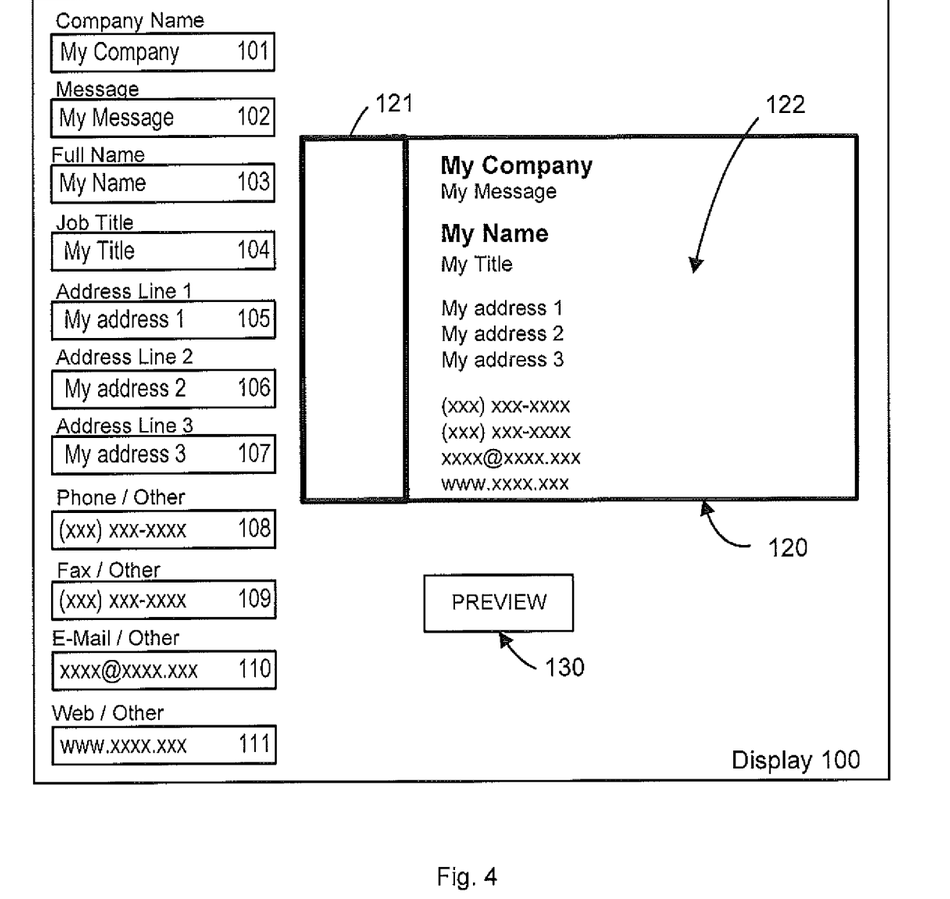
FIG. 4 shows a document customization screen.

Referring now to FIGS. 4-7D, representative examples of the application of the current invention will be discussed. For illustrative purposes, the text fields and templates are shown with generic information representing the type of data entries that might be made by users. The entries made by a user in the text fields will be generally referred to herein as "text", which will be understood to encompass all characters entered by the user including letters, numbers, punctuation marks, symbols, and the like. FIG. 4 depicts the status of display 100 after the entries shown have been made in text fields 101-111, Preview button 130 has been activated, and template 120 has been updated to reflect the information entered in text fields 101-111. It will be understood that the computer system where the updated template 120 image is generated is a design choice of the service provider. Generation of the updated template 120 image could be performed by browser program 305 using downloaded design tools 306 or design tools 306 could adapted to transfer the user's text entries to server 310 where the updated template 120 image description is prepared and returned to UCS 300 for displaying to the user.

Figure 5:
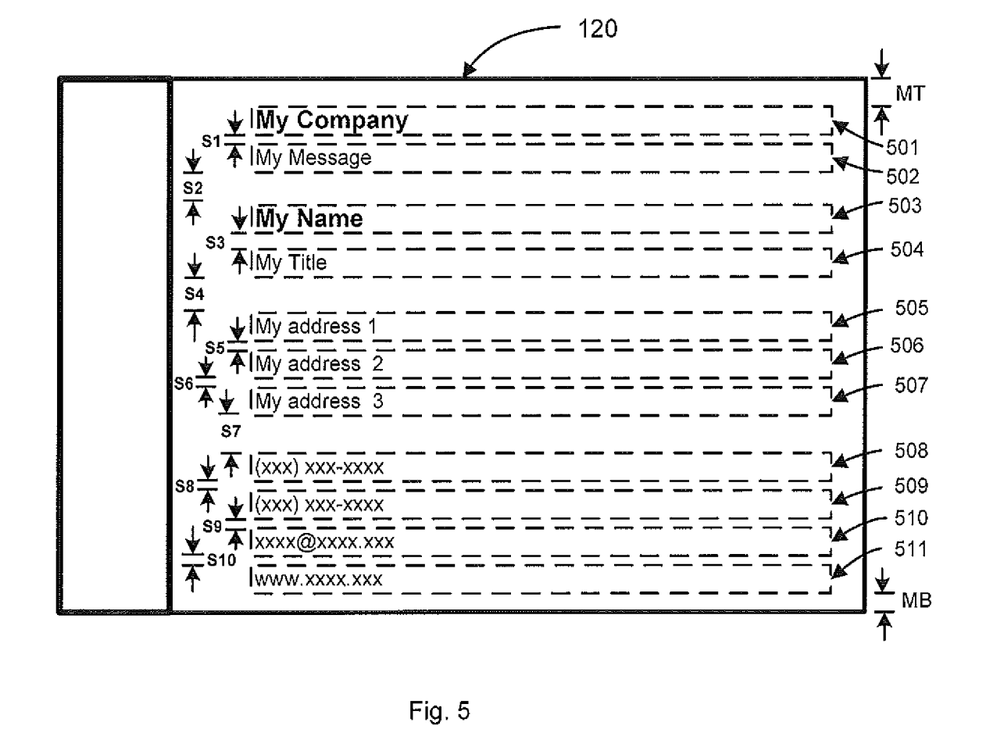
FIG. 5 shows the textbox elements and spacing of template 120 according to one embodiment of the invention.

Referring to FIG. 5, the textbox arrangement of template 120 according to an illustrative embodiment of the invention is depicted. Unlike the prior art technique described above in relation to FIG. 2, the positions of the textboxes displayed in template 120 are not fixed in advance, but are automatically and dynamically determined each time the user clicks Preview button 130 based on the user-entered information in text fields 501-511. Each textbox element 501-511 includes a parameter specifying its relative position in the textbox order. Spacing distances between adjacent displayed textboxes are also specified. A single standard spacing distance between adjacent text elements could be employed or multiple different distances could be used to provide greater layout flexibility. In the example depicted in FIGS. 4 and 5, the textboxes are organized into four groups. The spacing distance between adjacent groups is relatively larger than the spacing between adjacent textboxes within a group. That is, spacing distances S2, S4 and S7 are relatively larger than spacing distances S1, S3, S5, S6, S8, S9 and S10 such that four visually distinct groups are formed. As will be discussed in more detail below, this group spacing is maintained as long as even one textbox in a group contains text. To avoid placing text extremely close to the upper or lower edge of the design, textboxes cannot be located in defined minimum top (MT) and minimum bottom (MB) spaces.

Figure 6:
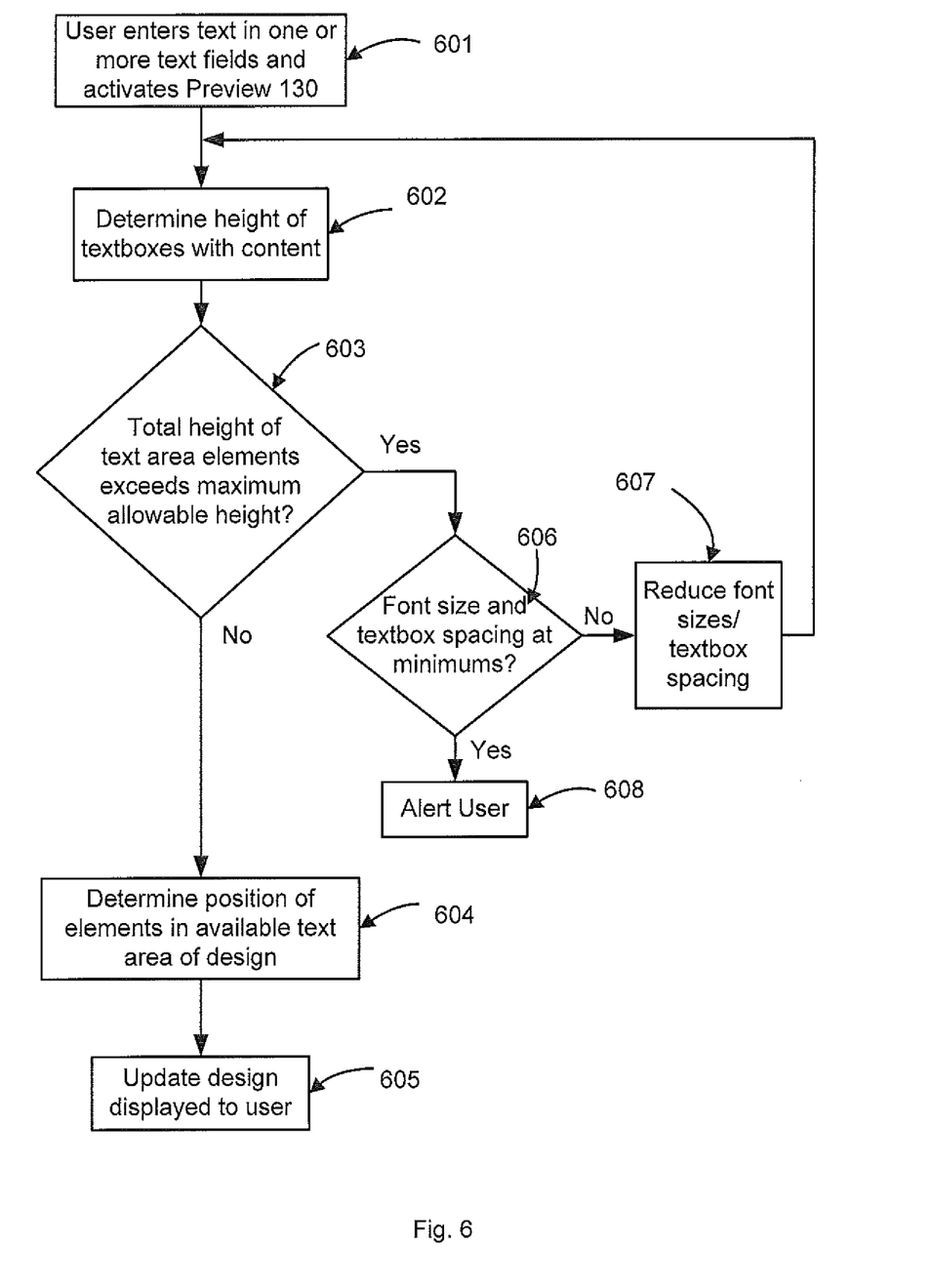
FIG. 6 shows a flow chart of one embodiment of the invention.

Referring now to FIG. 6, a representative process for automatically positioning elements will be discussed. At step 601, the user enters any desired text in any one or more of the available text entry fields 101-111. The user is not forced to make any entries and, therefore, one or more of the text fields may be empty when the user requests to view an updated template 120 by selecting Preview 130.

At step 602, the height in pixels of each textbox containing user-supplied text is determined. In the disclosed embodiment, this textbox height value is requested from operating system 303 via a rich text edit control. Alternatively, the value could be obtained from browser program 305. At step 603, the heights of all elements to be displayed in the available text area are combined to determine their total height. In this example, the heights of all textboxes containing user text are added to the defined spacing between the textboxes and this value is compared with the maximum allowable height available for user text. For the purposes of this calculation, all empty textboxes, and the related textbox separation spacing distances, are ignored. In template 120, the maximum height available for user text placement is the height of the template minus the minimum top and bottom spaces MT and MB that must remain empty. If a template design includes an image or other design element across the top and/or bottom of the template, the available vertical text area would be correspondingly reduced.

If the calculated height of the textboxes having text content and related spacing distances does not exceed the maximum allowable height, at step 604 the positions of the textboxes in the available text area 122 are determined. The textboxes are arranged in the appropriate vertical sequence and positioned such that approximately one-half of the total calculated height is above the horizontal centerline of the text area and one-half is below the centerline. At step 605, display 100 is updated to display template 120 with the user's text.

Figure 7A:
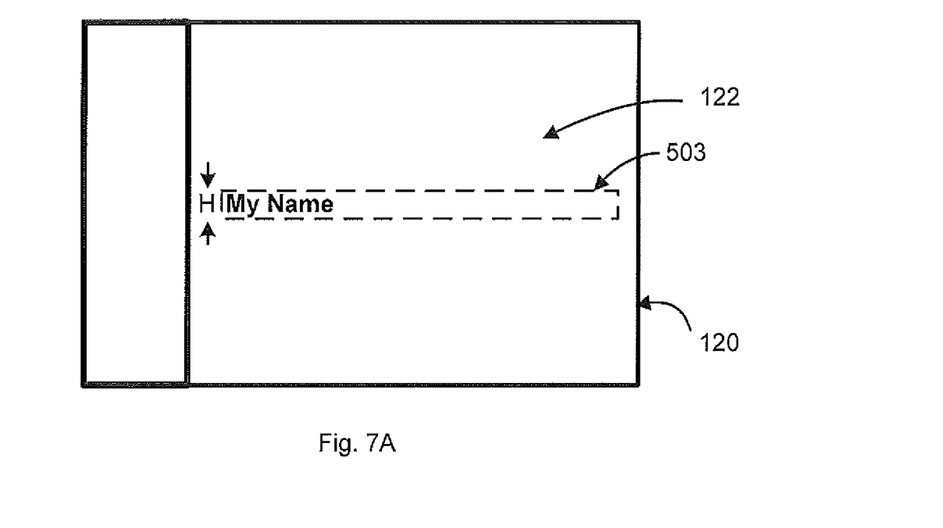
FIGS. 7A-7D depict illustrative product designs created according to one embodiment of the invention.

By way of illustration, FIG. 7A depicts the automatically generated layout result if the user were to enter "My Name" in text field 103, leaving all other text fields empty, and select Preview 130. In this situation, because only textbox 503 contains text, the total height H of the elements to be displayed in text area 122 is the height of textbox 503 and textbox 503 is substantially centered vertically in available text area 122.

Figure 7B:
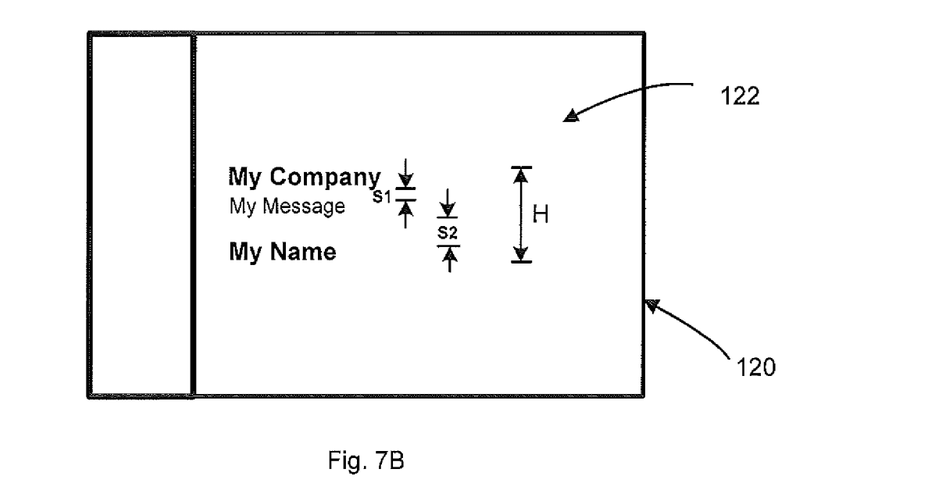
Figure 7C:
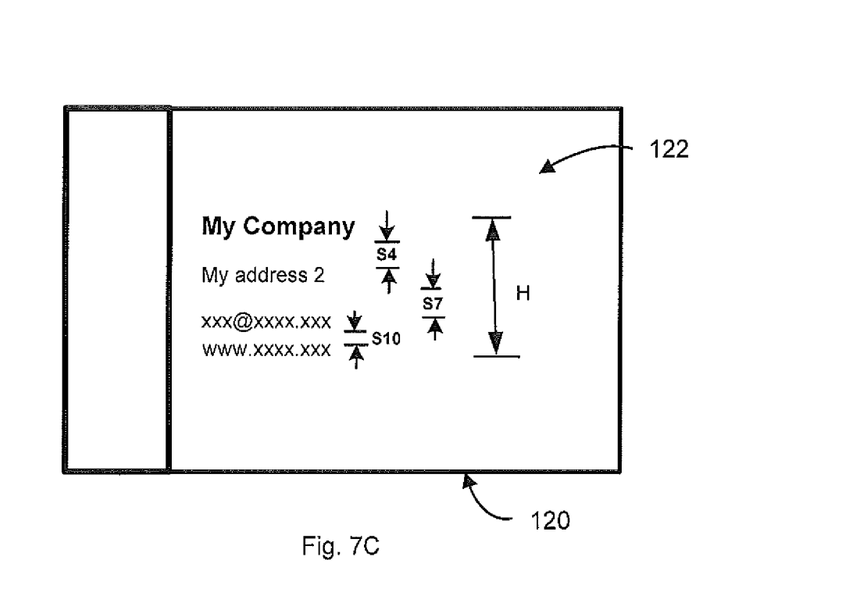
Figure 7D:
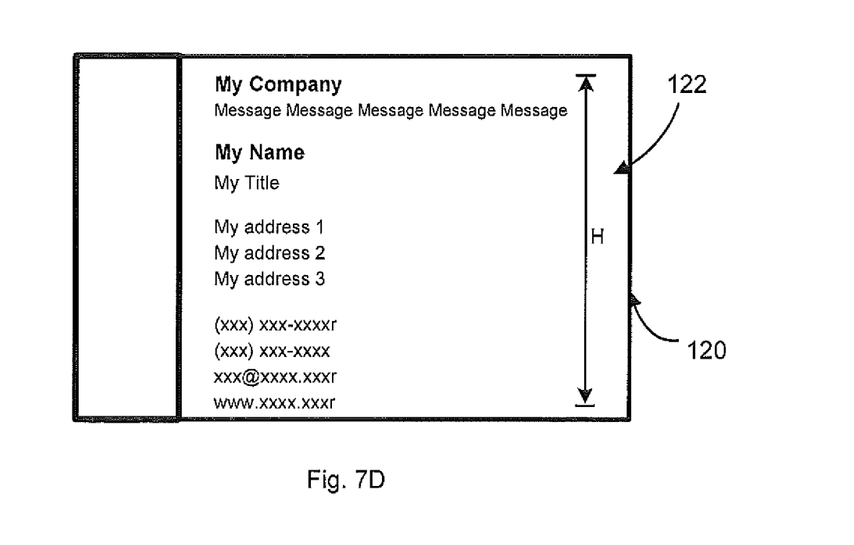

In FIGS. 7B-7D, discussed below, the outlines of the textboxes containing the text entries are omitted for clarity of illustration. FIG. 7B illustrates the layout result if the user were to enter "My Company" in text field 101, "My Message" in text field 102 and "My Name" in text field 103, leaving all other text fields empty, and select Preview 130. In this case, the total height H is the sum of the heights of the associated textboxes 501, 502, and 503 plus the spacing distances S1 and S2. The textboxes are then positioned in text area 122 such that substantially one-half of the total height H is above the horizontal centerline of the text area and one-half is below.

As mentioned above, the group spacing is maintained as long as even one textbox of a group contains text. For example, if the user were to have entered text only in text fields 101, 106, 110 and 111, that text would be arranged as shown in FIG. 7C. The text "My address 2" in textbox 506 is separated from "My Company" in textbox 501 by group spacing distance 54. Similarly, the entry "xxx@xxxx.xxx" in textbox 510 is separated from "My address 2" in textbox 506 by group spacing distance S7. The total height H in this situation is therefore equal to the total of the heights of the four textboxes 501, 506, 510 and 511 plus the spacing distances S4, S7 and S10. Again, the four textboxes are positioned in text area 122 such that substantially one-half of H is above the horizontal centerline and one-half below. It will be appreciated that it is not essential that the textboxes always be vertically centered in text area 122. Other positioning techniques could be employed, if desired by the service provider.

Referring again to FIG. 6, it is possible that the total height of the textboxes and textbox spacing determined at step 603 will exceed the maximum allowable height. This would typically occur because the user entered more text in one or more text fields 101-111 than can be rendered on a single line at the default font size and font characteristics for that textbox. Each textbox has a defined width that is, of course, limited by the physical boundaries of the product being designed. If a user enters more text than can be printed on a single line, the text will automatically wrap onto another line, thereby increasing the height of the textbox.

It can be appreciated that textboxes with multiple lines will not automatically require a reduction in the font size or textbox spacing. In some situations, the user may have left one or more text fields 101-111 empty, thereby leaving sufficient vertical space available to accommodate one or more multi-line textboxes. Font size and spacing reductions are only needed if the total of the heights of the textboxes with text, plus the spacing distances, exceeds the maximum height available for user text.

If it is detected at step 603 that the total height of the textboxes and spacing exceeds the maximum allowable height, the current font sizes and spacing distances are checked at step 606 to determine if they are already at the size identified by the printing services provider as being the minimum that provides an attractive and legible product. If the font sizes and spacing distances are not at the minimum, at step 607 the font size for all textboxes are reduced by one point size or, if font sizes are defined in pixels, by one pixel. If the font sizes have been reduced to their minimums, the spacing distances between all textboxes are incrementally reduced by one pixel until the spacing distances reach their defined minimums. If the fonts and spacing are both at the minimums, an alert is generated at step 608 to notify the user that an acceptable automated layout cannot be generated. It will be understood that various alternate techniques of incremental reductions could be employed, for example: maintaining fixed spacing distances and incrementally reducing only the font sizes, alternately reducing font size and spacing size until both are at their minimums, reducing the font sizes or spacing for only some textboxes instead of all, or reducing font sizes in a proportional manner such that larger fonts sizes are reduced by a proportionally greater number of pixels than smaller font sizes.

After each reduction at step 607, the combined heights of the textboxes and spacing distances are then recalculated at step 602 to determine if they no longer exceed the maximum allowable height at step 603. Steps 602, 603, 606 and 607 are repeated until either the total height no longer exceeds the maximum allowable height or the fonts and spacing distances are at the minimum allowable size as identified by the service provider.

As an example, if all text fields 101-111 contain text entries and a text string that is too long to be rendered on a single line at the initial font size specified for textbox 502, such as, for illustration, "Message Message Message Message Message", were entered in text field 102, the text would be wrapped onto two lines in textbox 502. The resulting increased height of textbox 502 would, in this case, cause the overall total height of all textboxes to exceed to the maximum. The font size and spacing of all textboxes would then be reduced incrementally until either the total height of all textboxes does not exceed the maximum available height, for example as depicted in FIG. 7D, or the font size and spacing distances are at the predefined minimums and cannot be further reduced without unacceptable degradation in the quality or usefulness of the design.

Figure 8A:
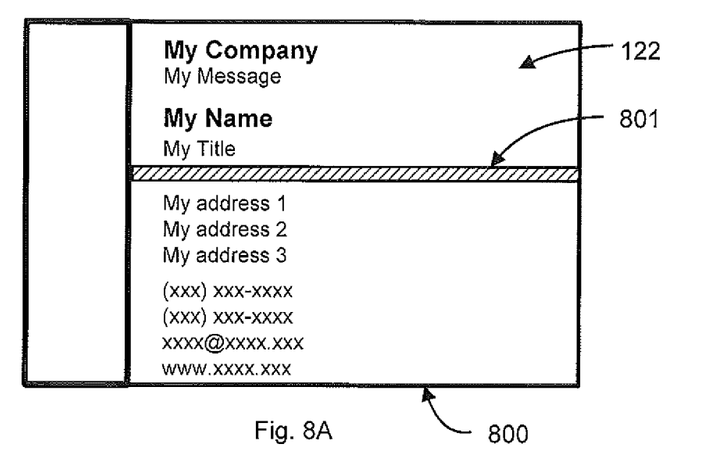
FIG. 8A-8B depict an alternate embodiment incorporating a design element in the template text area.
Figure 8B:
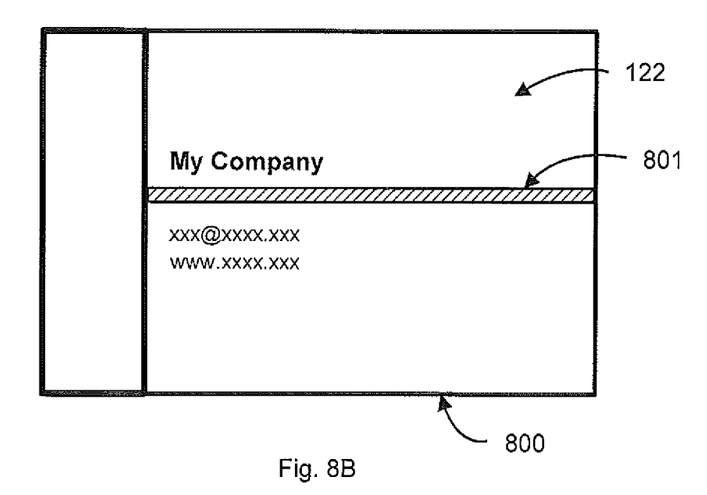

The invention is not limited to dynamic positioning only of textboxes. One or more design elements, for example lines, shapes, images, or other design features, could be similarly vertically positioned within text area 122 according to which and how many text fields are completed by the user. FIGS. 8A and 8B show two examples of a business card template 800 containing design element 801. Element 801 is assigned a relative position and spacing distance between the user entries in the top four textboxes and the user entries in the bottom seven textboxes. Like the vertical positions of the textboxes containing user text, the vertical position of element 801 in template 800 is not fixed, but is determined by the number and heights of the textboxes containing user data. Referring to step 603 of FIG. 6, the height and associated spacing of element 801 is added to the heights of the textboxes and related spacing to calculate the total height of all text area elements.

While the invention has been shown and described in various exemplary embodiments, the described embodiment is to be considered as illustrative rather than restrictive. For example, the design being customized could be for a product to be printed on paper or on any other printable medium such as cloth, glass, plastic, rubber, or wood. The design could be for a complete product, or intended to be incorporated into a larger product, such as a section, side, or page. The scope of the invention is as indicated in the following claims and all equivalent methods and apparatus.

What is claimed is:

1. A computer-implemented method for automatically positioning a plurality of text elements in an area of a markup language design of at least a portion of a document, the method comprising:

executing, at a computer system, one or more design tools;
   accessing, by the one or more design tools, the markup language design of the document, the markup language design defining a plurality of text elements each having a defined relative vertical positioning order, and further defining one or more vertical spacing distances, the one or more vertical spacing distances comprising one or more of either or both of a defined vertical spacing distance between adjacent text elements in the markup language design and a defined vertical spacing distance between data within the text elements in the markup language design,
   the one or more design tools configured to allow a user to specify text content for one or more of the text elements in the markup language design, determine which of the plurality of text elements have specified text content, determine at least the height of each of the determined text elements having specified text content, and based on at least the determined text element heights, the one or more vertical spacing distances, and the defined positioning order, position each of those text elements having specified text content in the area such that each text element in the area is vertically separated from each adjacent text element by a defined spacing distance, whereby the layout of the text elements having specified text content is determined.

2. The method of claim 1 wherein the one or more design tools are further configured to position the text elements having specified text content in the area such that the text elements are substantially centered vertically within the area.

3. The method of claim 1 wherein each of at least some of the defined text elements are assigned to one of a plurality of text element types and wherein the one or more design tools are further configured to position the text elements having specified text content such that the spacing distance between two sequentially positioned text elements of the same type is smaller than the spacing distance between two sequential positioned text elements not of the same type.

4. The method of claim 1 wherein the one or more design tools are further configured to determine the total combined height of all text elements having specified text content and the one or more vertical spacing distances before determining a position for the text elements and, if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

5. The method of claim 4 wherein the one or more design tools are further configured to also iteratively reduce one or more of the vertical spacing distances when iteratively reducing at least the text font size.

6. The method of claim 4 wherein, when iteratively reducing at least the text font size, the one or more design tools are further configured to also determine if the font sizes have been reduced to a minimum allowable size and, if so, terminate the font size reduction.

7. The method of claim 1 wherein the markup language document further defines one or more design elements each having a defined order position in the vertical display order of the text elements, the one or more vertical spacing distances further comprising one or more of any or any combination of a defined vertical spacing distance between adjacent text elements and design elements in the markup language design, a defined vertical spacing distance between adjacent design elements in the markup language design, and a defined vertical spacing distance between data within the text elements and design elements in the markup language design, and
   wherein the one or more design tools are further configured to determine a position in the area for the one or more design elements according to the defined display order.

8. The method of claim 7 wherein the one or more design tools are further configured to:
   determine the total combined height of the text elements having specified text content, the design elements, and the vertical spacing distances, and
   if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

9. The method of claim 8 wherein the one or more design tools are further configured to also iteratively reduce one or more of the vertical spacing distances when iteratively reducing at least the text font size.

10. The method of claim 8 wherein, when iteratively reducing at least the text font size, the one or more design tools are further configured to also determine if the font sizes have been reduced to a minimum allowable size and, if so, terminate the font size reduction.

11. The method of claim 1, wherein the one or more design tools are downloaded from one or more server computer systems.

12. The method of claim 1, wherein the one or more design tools are configured to reside partially on the computer system and partially on one or more server computer systems, and wherein the step of receiving user specified text content for one or more text elements in the markup language design is executed on the computer system and further comprises transferring the received user specified text content to a portion of the one or more design tools executing on the one or more server computer systems, and the steps of determining which of the plurality of text elements have specified text content, determining at least the height of each of the determined text elements having specified text content, and based on at least the determined text element heights, the one or more vertical spacing distances, and the defined positioning order, positioning each of those text elements having specified text content in the area such that each text element in the area is vertically separated from each adjacent text element to generate an updated markup language document are each executed on the one or more server computer systems to generate an updated markup language document.

13. The method of claim 12, further comprising:
the one or more server computer systems transferring the updated markup language document back to the computer system for display to a user of the computer system.

14. The method of claim 13, wherein the updated markup language document is displayed to a user at the computer system.

15. A non-transitory computer-readable medium having encoded therein computer instructions for automatically positioning a plurality of text elements in an area of a markup language design of at least a portion of a document to be printed, the instructions comprising instructions for implementing the method of claim 1.

16. A system for automatically positioning a plurality of text elements in an area of a markup language design of at least a portion of a document, the markup language design defining a plurality of text elements each having a defined relative vertical positioning order, and further defining one or more vertical spacing distances, the one or more vertical spacing distances comprising one or more of either or both of a defined vertical spacing distance between adjacent text elements in the markup language design and a defined vertical spacing distance between data within the text elements in the markup language design, the system comprising:
one or more design tools configured to access the markup language design of the document, allow a user to specify text content for one or more text elements in a markup language design, determine which of the plurality of text elements have specified text content, determine at least the height of each of the determined text elements having specified text content, and based on at least the determined text element heights, the one or more vertical spacing distances, and the defined positioning order, position each of those text elements having specified text content in the area such that each text element in the area is vertically separated from each adjacent text element by a defined spacing distance, whereby the layout of the text elements having specified text content is determined; and
one or more processors configured to execute the design tools.

17. The system of claim 16 wherein the one or more design tools are further configured to position the text elements having specified text content in the area such that the text elements are substantially centered vertically within the area.

18. The system of claim 16 wherein each of at least some of the defined text elements are assigned to one of a plurality of text element types and wherein the one or more design tools are further configured to position the text elements having specified text content such that the spacing distance between two sequentially positioned text elements of the same type is smaller than the spacing distance between two sequential positioned text elements not of the same type.

19. The system of claim 16 wherein the one or more design tools are further configured to determine the total combined height of all text elements having specified text content and the one or more vertical spacing distances before determining a position for the text elements and, if the total combined height is greater than the height of the area, to iteratively reduce at least the text font size of at least some of the text elements, determine a new height of each text element having text content at the reduced font size, and determine anew total combined height until the total combined height is less than or equal to the available height of the area.

20. The system of claim 19 wherein the one or more design tools are further configured to also iteratively reduce one or more of the vertical spacing distances when iteratively reducing at least the text font size.

21. The system of claim 19 wherein, when iteratively reducing at least the text font size, the one or more design tools are further configured to also determine if the font sizes have been reduced to a minimum allowable size and, if so, terminate the font size reduction.

22. The system of claim 16 wherein the markup language document further defines one or more design elements each having a defined order position in the vertical display order of the text elements, the one or more vertical spacing distances further comprising one or more of any or any combination of a defined vertical spacing distance between adjacent text elements and design elements in the markup language design, a defined vertical spacing distance between adjacent design elements in the markup language design, and a defined vertical spacing distance between data within the text elements and design elements in the markup language design, and
wherein the one or more design tools are further configured to determine a position in the area for the one or more design elements according to the defined display order.

23. The system of claim 22 wherein the one or more design tools are further configured to:
determine the total combined height of the text elements having specified text content, the design elements, and the vertical spacing distances, and
if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

24. The system of claim 23 wherein the one or more design tools are further configured to also iteratively reduce one or more of the vertical spacing distances when iteratively reducing at least the text font size.

25. The system of claim 23 wherein, when iteratively reducing at least the text font size, the one or more design tools are further configured to also determine if the font sizes have been reduced to a minimum allowable size and, if so, terminate the font size reduction.

26. The system of claim 16, wherein the one or more design tools are downloaded from one or more server computer systems.

27. The system of claim 16, wherein the one or more design tools are configured to reside partially on the computer system and partially on one or more server computer systems, wherein:
  a portion of the one or more design tools executing on the computer system are configured to receive user specified text content for one or more text elements in the markup language design, and to transfer the received user specified text content to a portion of the one or more design tools executing on the one or more server computer systems, and
  the portion of the one or more design tools executing on the one or more server computer systems is configured to determine which of the plurality of text elements have specified text content, determine at least the height of each of the determined text elements having specified text content, and based on at least the determined text element heights, the one or more vertical spacing distances, and the defined positioning order, position each of those text elements having specified text content in the area such that each text element in the area is vertically separated from each adjacent text element to generate an updated markup language document, and transfer the updated markup language document back to the portion of the one or more design tools executing on the computer system.

28. The system of claim 27, further comprising:
  the one or more server computer systems transferring the updated markup language document back to the computer system for display to a user of the computer system.

29. The system of claim 28, wherein the updated markup language document is displayed to a user at the computer system.

30. A computer-implemented method for automatically positioning a plurality of text elements in an area of a markup language design of at least a portion of a document, the markup language design defining a plurality of text elements each having a defined relative vertical positioning order, and further defining one or more vertical spacing distances, the one or more vertical spacing distances comprising one or more of either or both of a defined vertical spacing distance between adjacent text elements in the markup language design and a defined vertical spacing distance between data within the text elements in the markup language design, the method comprising:
  storing one or more design tools configured to allow a user to specify text content for one or more of the text elements in the markup language design, and further configured to determine which of the plurality of text elements have specified text content, determine at least the height of each of the determined text elements having specified text content, and based on at least the determined text element heights, the one or more vertical spacing distances, and the defined positioning order, position each of those text elements having specified text content in the area such that each text element in the area is vertically separated from each adjacent text element by a defined spacing distance, whereby the layout of the text elements having specified text content is determined; and
  downloading said one or more design tools to a client computer system for execution at the client computer system.

31. The method of claim 30 wherein the one or more design tools are further configured to position the text elements having specified text content in the area such that the text elements are substantially centered vertically within the area.

32. The method of claim 30 wherein each of at least some of the defined text elements are assigned to one of a plurality of text element types and wherein the one or more design tools are further configured to position the text elements having specified text content such that the spacing distance between two sequentially positioned text elements of the same type is smaller than the spacing distance between two sequential positioned text elements not of the same type.

33. The method of claim 30 wherein the one or more design tools are further configured to determine the total combined height of the text elements having specified text content and the one or more vertical spacing distances before determining a position for the text elements and, if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

34. The method of claim 33 wherein the one or more design tools are further configured to also iteratively reduce one or more of the vertical spacing distances when iteratively reducing at least the text font size.

35. The method of claim 33 wherein, when iteratively reducing at least the text font size, the one or more design tools are further configured to also determine if the font sizes have been reduced to a minimum allowable size and, if so, terminate the font size reduction.

36. The method of claim 30 wherein the markup language document further defines one or more design elements each having a defined order position in the vertical display order of the text elements, the one or more vertical spacing distances further comprising one or more of any or any combination of a defined vertical spacing distance between adjacent text elements and design elements in the markup language design, a defined vertical spacing distance between adjacent design elements in the markup language design, and a defined vertical spacing distance between data within the text elements and design elements in the markup language design, and
  wherein the one or more design tools are further configured to determine a position in the area for the one or more design elements according to the defined display order.

37. The method of claim 36 wherein the one or more design tools are further configured to:
  determine the total combined height of the text elements having specified text content, the design elements, and the vertical spacing distances, and
  if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

38. The method of claim 37 wherein the one or more design tools are further configured to also iteratively reduce one or more of the vertical spacing distances when iteratively reducing at least the text font size.

39. The method of claim 37 wherein, when iteratively reducing at least the text font size, the one or more design tools are further configured to also determine if the font sizes have been reduced to a minimum allowable size and, if so, terminate the font size reduction.

40. A non-transitory computer-readable medium having encoded therein computer instructions for automatically positioning a plurality of text elements in an area of a markup language design of at least a portion of a document to be printed, the instructions comprising instructions for implementing the method of claim 30.

41. A system for automatically positioning a plurality of text elements in an area of a markup language design of at least a portion of a document, the markup language design defining a plurality of text elements each having a defined relative vertical positioning order, and further defining one or more vertical spacing distances, the one or more vertical spacing distances comprising one or more of either or both of a defined vertical spacing distance between adjacent text elements in the markup language design and a defined vertical spacing distance between data within the text elements in the markup language design, the system comprising:
    one or more server computer systems storing one or more design tools configured to access the markup language design of the document, allow a user to specify text content for one or more text elements in a markup language design, determine which of the plurality of text elements have specified text content, determine at least the height of each of the determined text elements having specified text content, and based on at least the determined text element heights, the one or more vertical spacing distances, and the defined positioning order, position each of those text elements having specified text content in the area such that each text element in the area is vertically separated from each adjacent text element by a defined spacing distance, whereby the layout of the text elements having specified text content is determined; and
    one or more processors configured to transfer the one or more design tools to a client computer system for execution at the client computer system.

42. The system of claim 41 wherein the one or more design tools are further configured to position the text elements having specified text content in the area such that the text elements are substantially centered vertically within the area.

43. The system of claim 41 wherein each of at least some of the defined text elements are assigned to one of a plurality of text element types and wherein the one or more design tools are further configured to position the text elements having specified text content such that the spacing distance between two sequentially positioned text elements of the same type is smaller than the spacing distance between two sequential positioned text elements not of the same type.

44. The system of claim 41 wherein the one or more design tools are further configured to determine the total combined height of the text elements having specified text content and the one or more vertical spacing distances before determining a position for the text elements and, if the total combined height is greater than the height of the area, to iteratively reduce at least the text font size of at least some of the text elements, determine a new height of each text element having text content at the reduced font size, and determine a new total combined height until the total combined height is less than or equal to the available height of the area.

45. The system of claim 44 wherein the one or more design tools are further configured to also iteratively reduce one or more of the vertical spacing distances when iteratively reducing at least the text font size.

46. The system of claim 44 wherein, when iteratively reducing at least the text font size, the one or more design tools are further configured to also determine if the font sizes have been reduced to a minimum allowable size and, if so, terminate the font size reduction.

47. The system of claim 41 wherein the markup language document further defines one or more design elements each having a defined order position in the vertical display order of the text elements, the one or more vertical spacing distances further comprising one or more of any or any combination of a defined vertical spacing distance between adjacent text elements and design elements in the markup language design, a defined vertical spacing distance between adjacent design elements in the markup language design, and a defined vertical spacing distance between data within the text elements and design elements in the markup language design, and
    wherein the one or more design tools are further configured to determine a position in the area for the one or more design elements according to the defined display order.

48. The system of claim 47 wherein the one or more design tools are further configured to:
    determine the total combined height of the text elements having specified text content, the design elements, and the vertical spacing distances, and
    if the total combined height is greater than the height of the area, to iteratively reduce at least the text font size of at least some of the text elements, determine a new height of each text element having a text content at the reduced font size, and determine a new total combined height until the total combined height is less than or equal to the available height of the area.

49. The system of claim 48 wherein the one or more design tools are further configured to also iteratively reduce one or more of the vertical spacing distances when iteratively reducing at least the text font size.

50. The system of claim 48 wherein, when iteratively reducing at least the text font size, the one or more design tools are further configured to also determine if the font sizes have been reduced to a minimum allowable size and, if so, terminate the font size reduction.

51. A method for automatically positioning a plurality of content elements in an area of a markup language design of at least a portion of a document, the method comprising:
    accessing, by one or more processors, the markup language design of the document, the markup language design specifying a plurality of content elements defined according to a relative vertical positioning order, and further specifying one or more defined vertical spacing distances between vertically adjacent content elements,
    determining by the one or more processors one or more of the plurality of content elements specifying actual content for display,
    determining by the one or more processors respective heights of the determined content elements, and based on the determined heights, the one or more defined vertical spacing distances and the relative positioning order of the determined content elements, vertically positioning by the one or more processors the respective determined content elements in the area according to the relative positioning order and such that the respective determined content elements are vertically separated from each vertically adjacent determined content elements by a respective defined spacing distance.

52. The method of claim 51 further comprising:
    determining a total height of the determined content elements and the respective defined spacing distance, and
    positioning by the one or more processors the determined content elements such that approximately half of the total height is above a horizontal centerline of the area and half is below the horizontal centerline of the area so as to center wherein the one or more design tools are further configured to position the text elements having specified text content in the area such that the text elements are substantially centered vertically within the area.

53. The method of claim 51 wherein the plurality of content elements in the markup language design are organized into a plurality of groups and further wherein the one or more defined vertical spacing distances comprises a respective group spacing distance for each pair of vertically adjacent groups, and further wherein the respective group spacing distance is larger than the defined vertical spacing distances between adjacent content elements in each vertically adjacent group of the respective pair.

54. The method of claim 53 wherein the respective group spacing distance between each pair of vertically adjacent groups is maintained as long as even a single one of the plurality of content elements in each of the respective groups specifies actual content for display.

55. The method of claim 51 further comprising:
determining by the one or more processors the total combined height of all the determined content elements specifying actual content for display and the one or more defined vertical spacing distances associated with the determined content elements before determining a position for the determined content elements and,
if the total combined height is greater than the height of the area, iteratively reducing the text font size of at least some of the determined content elements specifying text content, determining a new height of each determined content element specifying text content at the reduced font size, and determining a new total combined height until the total combined height is less than or equal to the available height of the area.

56. The method of claim 55 further comprising iteratively reducing one or more of the defined vertical spacing distances when iteratively reducing at least the text font size.

57. The method of claim 55 wherein the text font size is reduced in proportion to the relative font size when iteratively reducing the text font size.

58. A system for automatically positioning a plurality of content elements in an area of a markup language design of at least a portion of a document, comprising:
one or more processors, the one or more processors configured to access the markup language design of the document, the markup language design specifying a plurality of content elements defined according to a relative vertical positioning order, and further specifying one or more defined vertical spacing distances between vertically adjacent content elements,
the one or more processors further configured to determine one or more of the plurality of content elements specifying actual content for display,
the one or more processors further configured to determine respective heights of the determined content elements, and based on the determined heights, the one or more defined vertical spacing distances and the relative positioning order of the determined content elements, vertically position the respective determined content elements in the area according to the relative positioning order and such that the respective determined content elements are vertically separated from each vertically adjacent determined content elements by a respective defined spacing distance.

59. The system of claim 58 further comprising:
the one or more processors further configured to determine a total height of the determined content elements and the respective defined spacing distance, and
the one or more processors further configured to position the determined content elements such that approximately half of the total height is above a horizontal centerline of the area and half is below the horizontal centerline of the area so as to center wherein the one or more design tools are further configured to position the text elements having specified text content in the area such that the text elements are substantially centered vertically within the area.

60. The system of claim 58 wherein the plurality of content elements in the markup language design are organized into a plurality of groups and further wherein the one or more defined vertical spacing distances comprises a respective group spacing distance for each pair of vertically adjacent groups, and further wherein the respective group spacing distance is larger than the defined vertical spacing distances between adjacent content elements in each vertically adjacent group of the respective pair.

61. The system of claim 60 wherein the respective group spacing distance between each pair of vertically adjacent groups is maintained as long as even a single one of the plurality of content elements in each of the respective groups specifies actual content for display.

62. The system of claim 58,
the one or more processors further configured to determine the total combined height of all the determined content elements specifying actual content for display and the one or more defined vertical spacing distances associated with the determined content elements before determining a position for the determined content elements and, if the total combined height is greater than the height of the area, iteratively reduce the text font size of at least some of the determined content elements specifying text content, determine a new height of each determined content element specifying text content at the reduced font size, and determine a new total combined height until the total combined height is less than or equal to the available height of the area.

63. The system of claim 62, the one or more processors further configured to iteratively reduce one or more of the defined vertical spacing distances when iteratively reducing at least the text font size.

64. The system of claim 62, the one or more processors further configured to iteratively reduce the text font size in proportion to the relative font size when iteratively reducing the text font size.

* * * * *